(No Model.)
C. E. ROBERTS.
BALL BEARING FOR VEHICLE WHEELS.
No. 580,956. Patented Apr. 20, 1897.
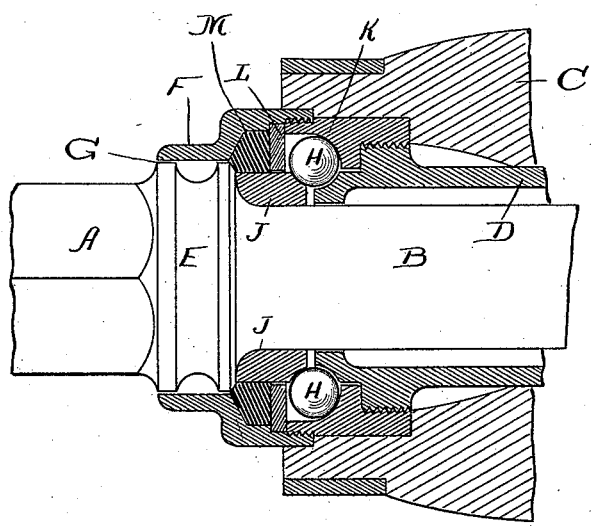
WITNESSES:
INVENTOR:
CHARLES E. ROBERTS
BY Munday, Evarts & Adcock.
HIS ATTORNEYS.

UNITED STATES PATENT OFFICE.

CHARLES E. ROBERTS, OF OAK PARK, ILLINOIS.

BALL-BEARING FOR VEHICLE-WHEELS.

SPECIFICATION forming part of Letters Patent No. 580,956, dated April 20, 1897.

Application filed June 4, 1896. Serial No. 594,253. (No model.)

*To all whom it may concern:*

Be it known that I, CHARLES E. ROBERTS, a citizen of the United States, residing in Oak Park, in the county of Cook and State of Illinois, have invented a new and useful Improvement in Ball-Bearings for Vehicle-Wheels, of which the following is a specification.

This invention is a modification of the construction shown in a companion application, Serial No. 594,251. In my said companion application I show the race of the bearing provided with a non-removable ring for confining the balls therein, and I also show the bearing provided with an outside sleeve attached directly to the hub and confining the water-excluding packing. In such construction the balls are permanently confined and the race can only be cleaned by using a cleansing fluid, which is not as convenient or satisfactory always as a construction which will permit the ready removal and insertion of the balls, and my main object in the present invention is to make the balls thus easily removable to facilitate cleaning and at the same time to obtain the benefit of the water-excluding features of my other construction. To this end the balls in my present invention are confined in the cup of the race by a removable ring, which is simply held in place by the cup upon one side and the sleeve upon the other, so that by simply detaching the sleeve the ring may be taken out and the balls will then be readily accessible and can be removed if desired. The sleeve is secured in position to thus hold the ring by means of a threaded engagement with the cup instead of being attached directly to the hub.

In the drawing I show a longitudinal section of my improved bearing, and in such section A represents the axle; B, the axle-spindle; C, the hub of the wheel; D, the box; E, the water-groove; F, the hub-sleeve; G, the annular passage or opening through which the water enters the bearing, and H H the balls; J, the cone; K, the cup; L, the ball-confining ring, and M the packing. These parts are similar in construction to those shown in said companion application, except in the following particulars: The ring L is made loose and removable instead of being permanently secured in the cup K. It is held in place against the end of the cup by the sleeve F, which has a threaded engagement with the cup, and an interior shoulder engaging the ring, as plainly shown, and is thus fitted to act as a retainer to the ring.

The water-excluding groove and the packing act in the way described in my said application, and the construction above set forth permits the ready removal of the balls whenever the race needs cleaning.

I claim—

1. The combination in a ball-bearing, of the balls, the cone, the cup, and the sleeve attached directly to the cup with a separate ball-retaining ring encircled by the sleeve and normally clamped between opposing surfaces upon the sleeve and the cup, substantially as specified.

2. The combination in a ball-bearing of the balls, the cup, the cone, the separate ring for confining the balls, and the removable water-excluding sleeve, the cup and sleeve being threaded together and clamping the ring between them, substantially as specified.

3. The ball-bearing having a detachable water-excluding sleeve F and cup K threaded together, a cone, a separate ball-retaining ring inside the sleeve and rigidly clamped between opposing surfaces upon the sleeve and cup, and a compressible water-excluding packing lying within the sleeve and compressed between it and the ring, substantially as specified.

CHARLES E. ROBERTS.

Witnesses:
EDW. S. EVARTS,
H. M. MUNDAY.